(12) United States Patent
Francisco et al.

(10) Patent No.: US 8,733,694 B2
(45) Date of Patent: May 27, 2014

(54) ARRANGEMENT FOR MAINTAINING FLOW TO AN AIR INLET OF AN AUXILIARY POWER UNIT ASSEMBLY

(76) Inventors: Jay M. Francisco, Chula Vista, CA (US); James C. Napier, San Diego, CA (US)

(*) Notice: Subject to any disclaimer, the term of this patent is extended or adjusted under 35 U.S.C. 154(b) by 431 days.

(21) Appl. No.: 12/985,537

(22) Filed: Jan. 6, 2011

(65) Prior Publication Data

US 2012/0174595 A1   Jul. 12, 2012

(51) Int. Cl.
 *B64D 41/00* (2006.01)
 *B64D 33/02* (2006.01)

(52) U.S. Cl.
 USPC .................................. 244/58; 244/53 B

(58) Field of Classification Search
 USPC ............... 244/58, 1 N, 53 B, 207, 134 B; 60/39.093; 415/175–176
 See application file for complete search history.

(56) References Cited

U.S. PATENT DOCUMENTS

| | | | |
|---|---|---|---|
| 3,123,283 A * | 3/1964 | Leis | 415/115 |
| 3,341,114 A * | 9/1967 | Larson | 415/175 |
| 4,458,865 A | 7/1984 | Sandorff | |
| 5,029,440 A * | 7/1991 | Graber et al. | 60/39.093 |
| 5,397,217 A * | 3/1995 | DeMarche et al. | 416/97 R |
| 5,414,232 A | 5/1995 | Wilson | |
| 5,623,821 A * | 4/1997 | Bouiller et al. | 60/39.093 |
| 6,964,170 B2 | 11/2005 | Alkabie | |
| 7,008,186 B2 * | 3/2006 | Heeg et al. | 416/97 R |
| 7,137,240 B2 | 11/2006 | Thompson | |
| 7,350,619 B2 | 4/2008 | Williams | |
| 7,431,127 B2 | 10/2008 | deBorchgrave et al. | |
| 7,578,369 B2 | 8/2009 | Francisco et al. | |
| 7,597,283 B2 * | 10/2009 | Hernanz Manrique et al. | 244/53 B |
| 7,762,081 B2 | 7/2010 | Williams | |
| 8,246,291 B2 * | 8/2012 | Wolford | 415/1 |
| 8,366,047 B2 * | 2/2013 | Euvino et al. | 244/134 D |
| 2007/0214767 A1 | 9/2007 | Napier et al. | |
| 2009/0045009 A1 * | 2/2009 | Chiou et al. | 181/290 |
| 2009/0191047 A1 | 7/2009 | Schlinker et al. | |

* cited by examiner

Primary Examiner — Tien Dinh

(57) ABSTRACT

An example auxiliary power unit air inlet assembly includes a noise attenuating component disposed within a conduit. The conduit is configured to communicate a first flow of fluid to an auxiliary power unit. A second flow of fluid is communicated to the noise attenuating component. The second flow of fluid limits formation of ice in the conduit. The first flow of fluid is different than the second flow of fluid.

5 Claims, 4 Drawing Sheets

ARRANGEMENT FOR MAINTAINING FLOW TO AN AIR INLET OF AN AUXILIARY POWER UNIT ASSEMBLY

BACKGROUND

This disclosure relates generally to maintaining flow of air to an auxiliary power unit and, more particularly, to inhibiting ice buildup within an auxiliary power unit air inlet assembly.

Turbomachines extract energy from a flow of fluid as is known. During operation, air is pulled into the turbomachine. The air is then compressed and combusted. The products of combustion expand to rotatably drive a turbine section of the turbomachine.

One example turbomachine is an auxiliary power unit (APU). The typical APU is located in the tail section of a commercial aircraft. The APU provides electrical power and compressed air to the aircraft. An inlet air assembly delivers air from the environment surrounding the aircraft to the operating APU. The air is typically very cold in flight.

As known, the APU generates significant noise during operation. The noise can propagate through the inlet air assembly and disturb passengers on the aircraft and the surrounding environment on the ground. Accordingly, the inlet air assemblies of many APUs incorporate a noise attenuation device. The cold air delivered to the APU flows past the noise attenuation device. The cold air can result in ice forming on or near the noise attenuation device. Once formed, the ice can undesirably block the flow of air moving to the APU through the inlet air assembly. Ice can also break off and foul the engine.

SUMMARY

An example auxiliary power unit air inlet assembly includes a noise attenuating component disposed within a conduit. The conduit is configured to communicate a first flow of fluid to an auxiliary power unit. A second flow of fluid is communicated to the noise attenuating component. The second flow of fluid limits formation of ice in the conduit. The first flow of fluid is different than the second flow of fluid.

Another example auxiliary power unit air inlet assembly includes a conduit configured to communicate a first flow of fluid to an auxiliary power unit and a noise attenuating component disposed within the conduit. The first flow of fluid and a second flow of fluid both flow near the noise attenuating component. The first flow of fluid is different than the second flow of fluid.

An example method of maintaining flow through a noise attenuating component of an auxiliary power unit inlet air assembly includes moving a first flow of fluid past a noise attenuating component disposed within a conduit of an auxiliary power unit inlet air assembly. The method further includes moving a second different flow of fluid near the noise attenuating component to limit ice accumulation near the noise attenuating component.

These and other features of the disclosed examples can be best understood from the following specification and drawings, the following of which is a brief description.

DETAILED DESCRIPTION

Figure 1:
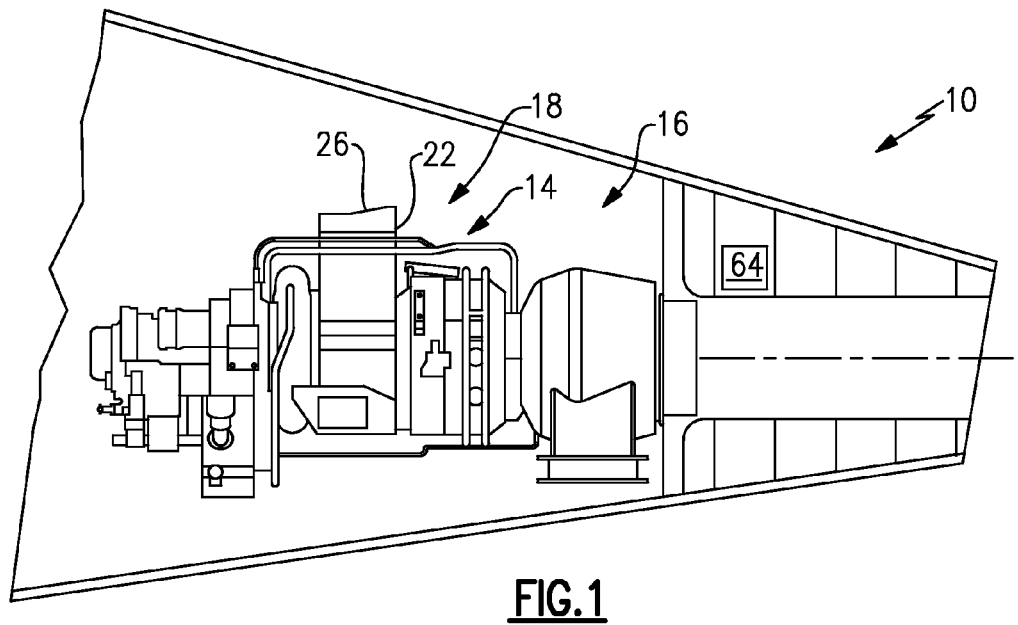
FIG. 1 shows a side view of an auxiliary power unit within a tail section of an aircraft.
Figure 2:
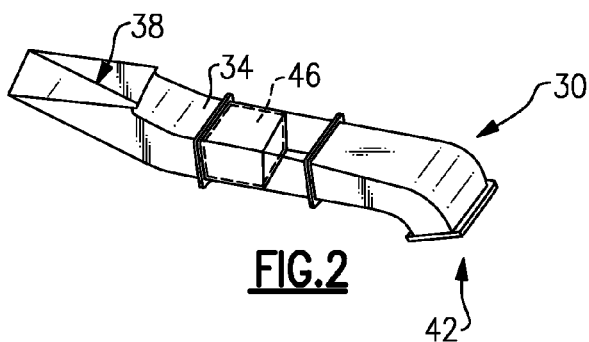
FIG. 2 shows an inlet air assembly that delivers air to the FIG. 1 auxiliary power unit.
Figure 3:
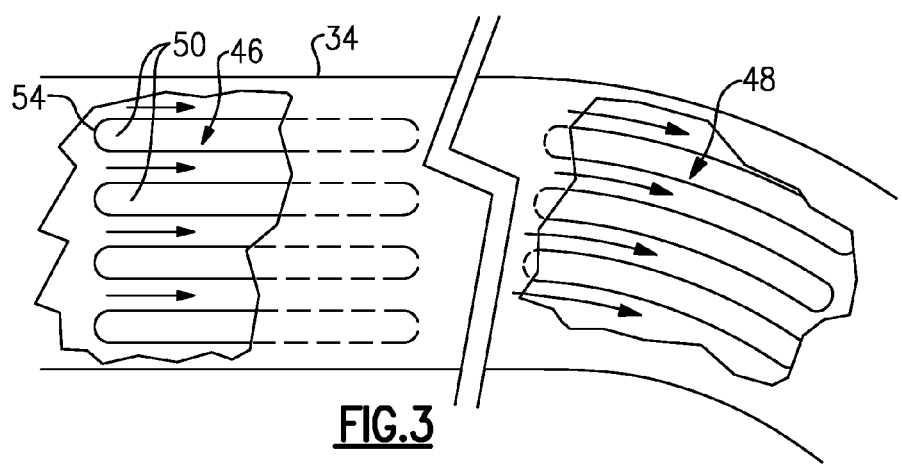
FIG. 3 shows a side view of a noise attenuating component in the FIG. 2 inlet air assembly.

Referring to FIG. 1, a tail section 10 of an example aircraft houses an auxiliary power unit (APU) 14 within an auxiliary power unit compartment 16. As known, the APU 14 is used to provide power and pressurized air for use in the aircraft.

During operation, air moves to a turbine section 18 of the APU 14 from a plenum 22. Air moves to the plenum 22 through a plenum opening 26. The APU 14 includes various other components to assist in its operation. Also, although shown in the tail section 10 of the aircraft, a person having skill in this art and the benefit of this disclosure will understand that the APU 14 could be located elsewhere within the aircraft.

Referring now to FIGS. 2-4A with continuing reference to FIG. 1, an inlet air assembly 30 includes a duct 34 or conduit extending from an inlet 38 to an outlet 42. During operation of the APU 14, a first flow of air moves through the duct 34 from the inlet 38 to the outlet 42. The inlet 38 receives the first flow of air from the environment surrounding the tail section 10. The outlet 42 delivers the first flow of air directly to the plenum opening 26 of the plenum 22. The delivered air is used by the APU 14.

In this example, a component, such as a noise attenuating component 46, is disposed within the duct 34. The noise attenuating component 46 helps reduce the noise propagating from the APU 14.

The example noise attenuating component 46 is an arrangement of acoustic splitter vanes 50. The component is an arrangement of turning vanes 48 in another example.

The acoustic splitter vanes 50 each have a leading edge 54, which faces upstream relative to the first flow of air from the inlet 38 and the outlet 42. As known, ice forming on the vanes 50 can undesirably block the first flow of air. Ice can also break off and foul the APU 14. The leading edges 54 of the vanes 50 are especially prone to ice formation.

Accordingly, in this example, a second flow of air moves through a passage 58 within the vanes 50. An air source 60 provides the second flow of air, which, in this example, is warmer than the first flow of air. The second flow of air warms the vanes 50 to inhibit ice formation. A valve 62 may be included to shut-off or turn on the flow of air from the air source 60.

The air source 60 can take many forms. In one example, bleed air provided by the APU 14 is used. In other examples, compartment air from the aircraft, or air from an exhaust silencer of the APU 14 are used. The exhaust silencer may be housed within the auxiliary power unit compartment 16. An eductor 64 may be used to draw air from the compartment or from the exhaust silencer. The eductor 64 may use the high velocity exhaust gas of the APU 14 as motive flow. A person having skill in this art and the benefit of this disclosure would understand how to communicate the air from the air source 60 to the passages 58.

Figure 4A:
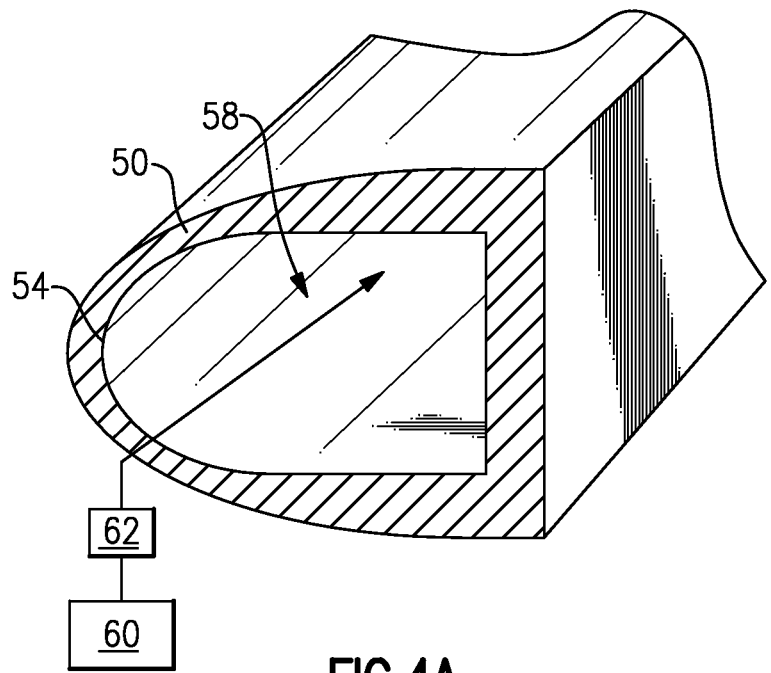
FIG. 4A shows a leading edge portion of a splitter vane in the FIG. 3 noise attenuating component.
Figure 4B:
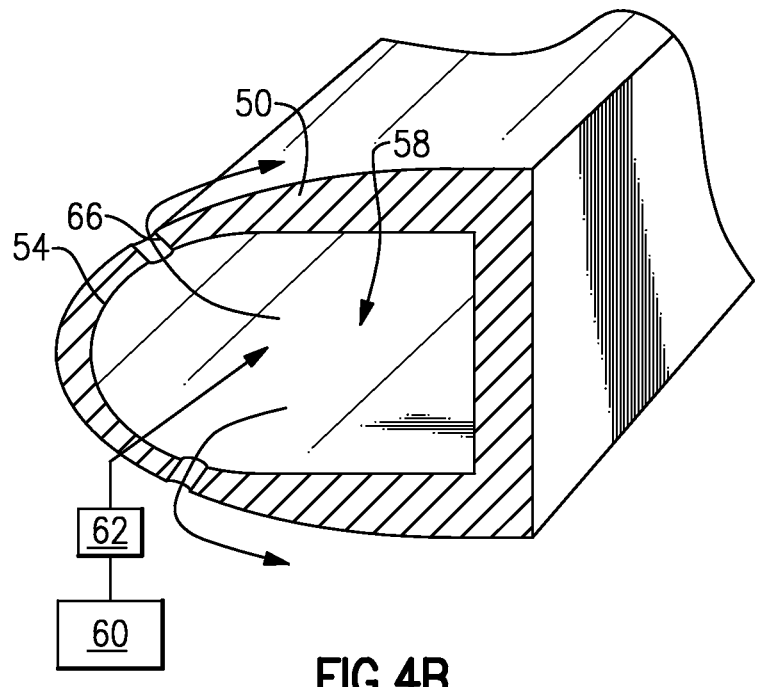
FIG. 4B shows a leading edge of another example vane in a different type of noise attenuating component.
Figure 5:
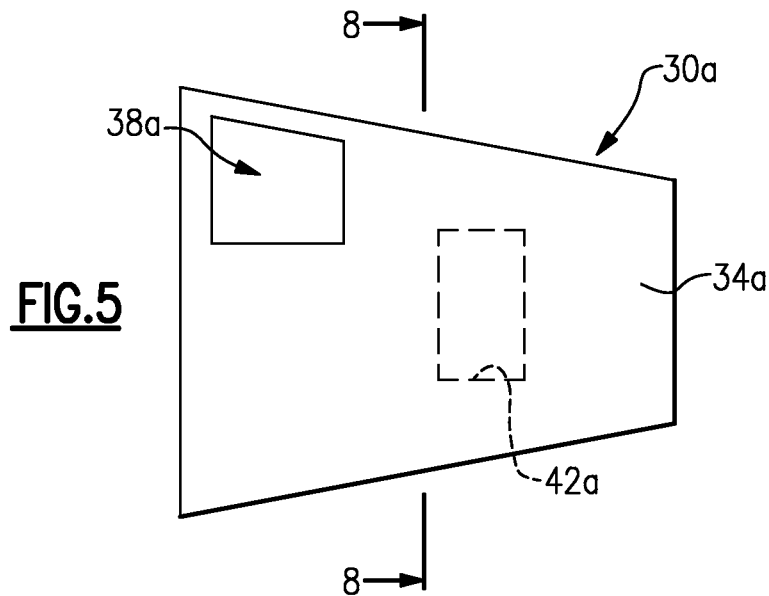
FIG. 5 shows a top view of another example inlet air assembly that is able to deliver air to the FIG. 1 auxiliary power unit.
Figure 6:
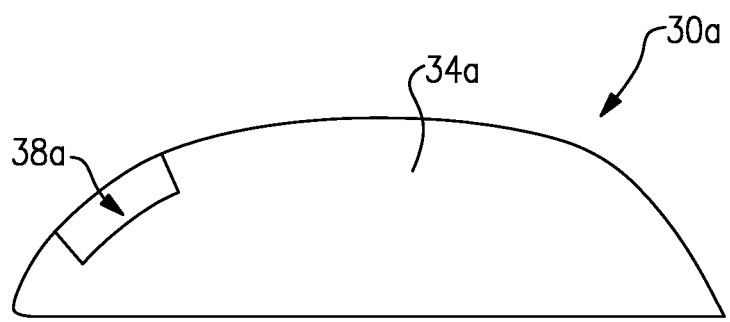
FIG. 6 shows an end view of the FIG. 5 inlet air assembly.
Figure 7:
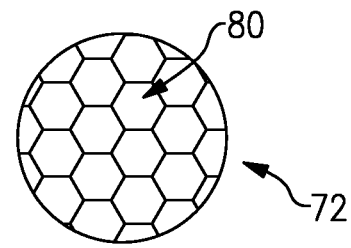
FIG. 7 shows a close-up view of a noise attenuating component in the FIG. 5 inlet air assembly.

In the example of FIG. 4B, the leading edge 54 establishes a plurality of apertures 66. The second flow of air moves from the passages 58, through the apertures 66, and over the leading edges 54. As can be appreciated, the second flow of air mixes with the flow of air after the second flow of air moves through the apertures 66.

Referring now to FIGS. 5-8A with continuing reference to FIG. 1, another example inlet air assembly 30a includes a hemispherical duct 34a that establishes an inlet 38a and an outlet 42a. The first flow of air moves from the outlet 42a directly to the plenum opening 26. During a portion of its travel from the inlet 38a to the outlet 42a, the first flow of air flows along a path 70, which is established between walls 68 of the duct 34a.

The example inlet air assembly 30a includes a noise attenuating component 46a, which, in this example, is a layer of honeycomb feltmetal material 72 spaced from the interior surfaces of the walls 68 of the duct 34a. Passages 76 are established between the noise attenuating component 46a and the walls 68.

In this example, air communicates through the passages 76 warms, and maintains the temperature of, the noise attenuating component 46a. As can be appreciated, warming the noise attenuating component 46a inhibits ice formation. A shut-off device 78, such as a valve, may be included to stop the communication of air through the passages 76 and the warming of the noise attenuating component 46a.

Figure 8A:
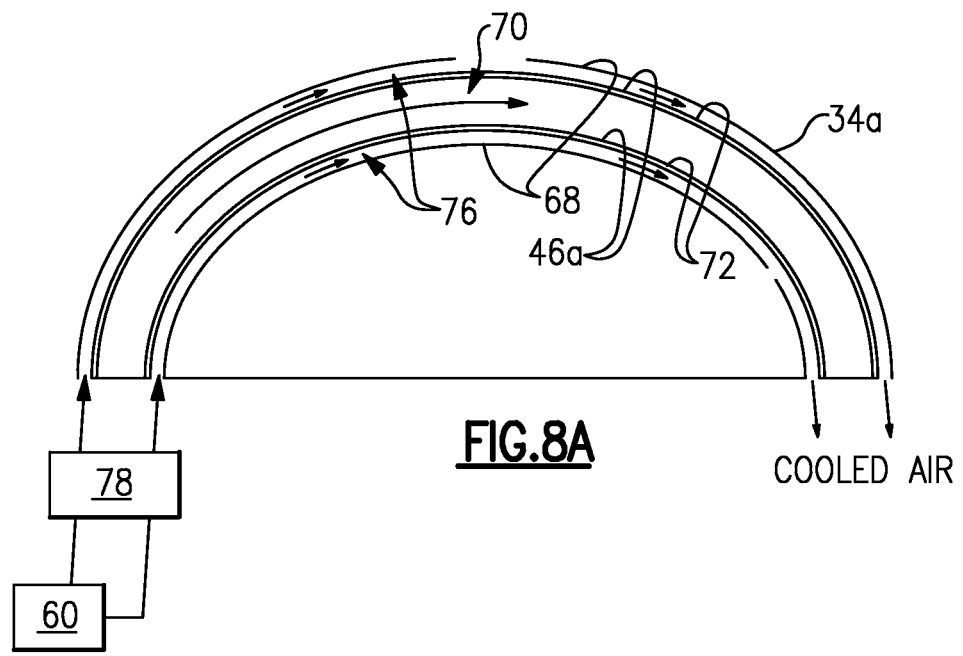
FIG. 8A shows a section view at line 8-8 of FIG. 5.
Figure 8B:
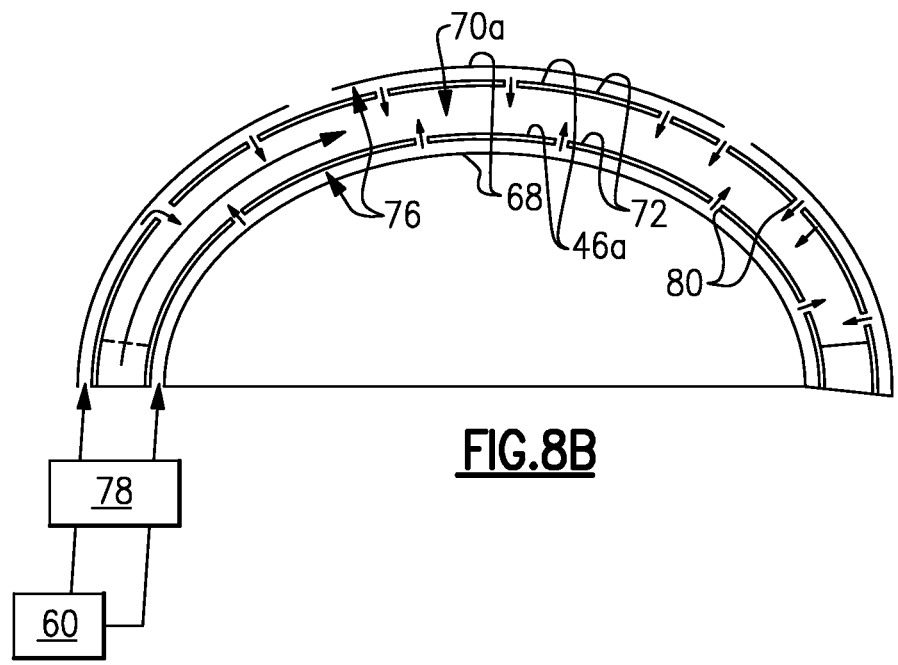
FIG. 8B shows a section view at line 8-8 of FIG. 5 in a different type of noise attenuating component.

Referring to FIG. 8B, the noise attenuating component 46a may establish a plurality of apertures 80 that deliver the second flow of air communicating through the passage 76 to the path 70a. As can be appreciated, the second flow of air mixes with the flow of air after the second flow of air moves through the apertures 80.

As with the examples of FIGS. 1-4B, the air source 60 of FIGS. 8A and 8B can take many forms. In one example, the air source 60 is heated air that is communicated to the noise attenuating component 46a from a silencer of the APU 14. The heated air is the second flow of air that is circulated along the noise attenuating component 46a, diffused through apertures 80 (FIG. 8B) in the noise attenuating component 46a, or both.

Features of this invention include inhibiting ice formation within an inlet air assembly, particularly ice formation near a noise attenuating component of the inlet air assembly. Preventing ice buildup protects against potential compressor surges that can damage or shut down auxiliary power units or ice that can foul the engine.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An auxiliary power unit air inlet assembly, comprising:
    a noise attenuating component disposed within a conduit, the conduit configured to communicate a first flow of fluid to an auxiliary power unit, wherein a second flow of fluid that limits formation of ice in the conduit is communicated to the noise attenuating component, the first flow of fluid different than the second flow of fluid,
    wherein the noise attenuating component comprises a layer of acoustic material, the layer and a wall of the conduit together establishing a passage configured to communicate the second flow of fluid between the layer and the wall of the conduit,
    wherein the second flow of fluid comprises both an inner second flow of fluid and an outer second flow of fluid, the first flow of fluid positioned within the conduit between the inner and outer second flows of fluid.

2. The auxiliary power unit air inlet assembly of claim 1, wherein the layer of acoustic material comprises a honeycombed felt metal.

3. The auxiliary power unit air inlet assembly of claim 1, wherein the layer of acoustic material establishes a plurality of apertures configured to communicate the second flow of fluid away from the passage and the wall of the conduit.

4. The auxiliary power unit air inlet assembly of claim 1, wherein the second flow of fluid is heated relative to the first flow of fluid.

5. The auxiliary power unit air inlet assembly of claim 1, wherein the passage extends along an arched path.

\* \* \* \* \*